United States Patent
Boye

(10) Patent No.: US 7,282,155 B2
(45) Date of Patent: Oct. 16, 2007

(54) DEVICE AND A METHOD FOR FILTERING A FLUID

(75) Inventor: Bo Boye, Birkeroed (DK)

(73) Assignee: Fibra Limited, Berkshire (GB)

( * ) Notice: Subject to any disclaimer, the term of this patent is extended or adjusted under 35 U.S.C. 154(b) by 0 days.

(21) Appl. No.: 10/388,165

(22) Filed: Mar. 14, 2003

(65) Prior Publication Data

US 2003/0178366 A1    Sep. 25, 2003

Related U.S. Application Data

(63) Continuation of application No. PCT/EP01/10707, filed on Sep. 17, 2001.

(30) Foreign Application Priority Data

Sep. 19, 2000    (GB)    ................................ 0022950.0

(51) Int. Cl.
   *B01D 37/00*    (2006.01)
(52) U.S. Cl. .................... 210/767; 55/304; 95/277; 95/282; 210/350; 210/351; 210/505; 210/748; 210/791
(58) Field of Classification Search ................ 210/350, 210/351, 409, 411, 503–508, 791, 192, 798, 210/321.87, 321.88, 321.89, 500.23, 636, 210/650, 748
   See application file for complete search history.

(56) References Cited

U.S. PATENT DOCUMENTS

| | | | | |
|---|---|---|---|---|
| 154,660 A | * | 9/1874 | Fulghum | .................... 210/266 |
| 673,597 A | * | 5/1901 | Diehl | .......................... 210/351 |
| 3,526,001 A | * | 8/1970 | Smith | .......................... 210/654 |
| 4,219,420 A | | 8/1980 | Muller | |
| 4,272,773 A | * | 6/1981 | Halasz | .................... 346/140 R |
| 4,617,120 A | | 10/1986 | Barzuza et al. | ............. 210/409 |
| 4,678,573 A | * | 7/1987 | Otstot et al. | ..................... 96/8 |
| 4,793,932 A | * | 12/1988 | Ford et al. | ................... 210/636 |
| 4,851,136 A | * | 7/1989 | Fanqing et al. | ............ 210/798 |
| 4,915,835 A | * | 4/1990 | Barzuza et al. | ............. 210/350 |

(Continued)

FOREIGN PATENT DOCUMENTS

EP        0 207 797 A2    1/1987

(Continued)

OTHER PUBLICATIONS

Opposition Papers filed for European Patent No. 1 322 398 B1 (European Application No. 01969725.9), dated Dec. 2006.

*Primary Examiner*—Joseph Drodge
(74) *Attorney, Agent, or Firm*—Pillsbury Winthrop Shaw Pittman LLP

(57) ABSTRACT

A device for filtering a fluid includes a fiber housing having an inlet end with at least one inlet and an outlet end with at least one outlet. The fiber housing surrounds and defines an outer bound for a plurality of fibers extending longitudinally in the fiber housing between the inlet end and the outlet end, whereby longitudinally extending interspaces is provided between the fibers, with the interspaces defining a plurality of flow passages for the fluid. At least part of the fiber housing is formed of a flexible membrane surrounding the fibers, and a compression tool is provided for creating a pressure on an outer surface of the flexible membrane thereby compressing the fibers in a radial direction at least one location along the length of the fibers.

117 Claims, 4 Drawing Sheets

U.S. PATENT DOCUMENTS 5,006,264 A * 4/1991 Acuna ......................... 210/741
5,470,470 A    11/1995 Leyat ......................... 210/350

FOREIGN PATENT DOCUMENTS

| | | |
|---|---|---|
| EP | 0280052 B1 | 7/1994 |
| FR | 2 461 514 | 2/1981 |
| SU | 511962 | 4/1976 |
| SU | 1122338 A | 11/1984 |
| WO | WO 94/11088 | 5/1994 |
| WO | WO 02/24306 A1 | 3/2002 |

* cited by examiner

DEVICE AND A METHOD FOR FILTERING A FLUID

This application is a continuation of PCT/EP01/10707, filed Sep. 17, 2001, which designated the United States and was published in English under PCT Article 21(2) on Mar. 28, 2002 as International Publication Number WO 02/24306 A1. PCT/EP01/10707 claims priority to U.S. application No. 60/233,658 and British Application 0022950.0, both filed Sep. 19, 2000. The entire contents of the three applications are incorporated herein by reference.

BACKGROUND OF THE INVENTION

1. Field of the Invention

The present invention relates to a device and a method for filtering a fluid. More particularly the present invention relates to a device for filtering a fluid wherein a plurality of fibers extend longitudinally in the direction of the fluid flow during filtration of the fluid.

2. Description of the Related Art

U.S. Pat. No. 4,219,420 discloses an arrangement for filtering a contaminated fluid or medium. According to the disclosure of this patent a plurality of fiber bundles are located on a support and extend within a filter housing in direction between an inlet and an outlet of the housing. The fluid to be filtered is introduced through the inlet in a direction towards the outlet. The contaminated particles become arrested among the fibers as it passes through the plurality of fiber bundles. In order to improve the "depth effect" of the fiber bundles, the fibers may have different lengths. Here the quality of the filtered fluid depends on the density of the fiber bundles. However, in order to increase the quality of the filtration process, the density of the fibers must be increased, which requires more fiber bundles to be inserted into the filter housing.

An improvement to the filter of U.S. Pat. No. 4,219, 420 has been proposed in U.S. Pat. No. 4,851,136. Here a filter housing comprises a support with a plurality of fiber bundles attached to the support and extending within the filter housing in direction between an inlet and an outlet. A flexible water-proof membrane is provided within the filter housing to constitute a pressure chamber. When pressurized during the filtration process, the membrane presses the plurality of fiber bundles to form a frustrum-like filter chamber, and the fluid becomes filtered as it passes through the frustrum-like chamber. Here the density of the fibers and thus the quality of the filtration can be controlled by adjusting the pressure in the pressure chamber whereby the compressing of the fibers is adjusted.

Another filter having fibers extending longitudinally in the direction of the fluid flow, and wherein the density of the fibers is adjusted by compressing the fibers, is disclosed in U.S. Pat. No. 5,690,823. Here the fibers are arranged within an opening defined by a retaining member, and a displacement member comprising a conical-shaped part is arranged in the center of the fibers. By moving the displacement member in a direction along the fibers, the compressing of the fibers against the retaining member is adjusted whereby the density of the fibers and the quality of the filtration is controlled.

Thus, the principles of having a fluid filtration wherein a plurality of fibers extend longitudinally in the direction of the fluid flow, and wherein the quality of the filtration is controlled by adjusting the compression and thereby the density of the fibers are known.

The filtering device of U.S. Pat. No. 4,219,420 uses a pressure chamber in order to compress the fibers, whereas the filtering device of U.S. Pat. No. 5,690,823 has a conical shaped displacement member arranged in the center of the fibers in order to compress the fibers against a retaining member. Both of these filtering devices are relatively expensive to produce.

However, today there is much focus on the quality of water for use domestically as well for industrial purposes, partly due to the increasing pollution of the environment and partly due to increasing public awareness with regard to the quality of food and beverages. Furthermore, the population growth results in an even higher demand for a simple, inexpensive and effective device for filtering a fluid such as water.

SUMMARY OF THE INVENTION

Thus, there is an increasing need for a simple, inexpensive and effective device for filtering a fluid. Therefore, it is an object of the present invention to provide a device for filtering a fluid, which device is effective in filtering the fluid, is inexpensive to produce and is simple to operate.

In order to provide such an improved filtering device, the present invention in a first aspect provides a device for filtering a fluid, the device including a fiber housing having an inlet end with at least one inlet and an outlet end with at least one outlet, the fiber housing surrounding and defining an outer bound for a plurality or a bundle of fibers extending longitudinally in the fiber housing between the inlet end and the outlet end, whereby longitudinally extending interspaces are provided between the fibers, the interspaces defining a plurality of flow passages for the fluid. Here, at least part of the fiber housing is formed of a flexible membrane surrounding the fibers, and compression tool is provided for creating a pressure on an outer surface of the flexible membrane thereby compressing the fibers in a radial direction at at least one location along the length of the fibers. It is preferred that the plurality of fibers extend substantially the whole length of the fiber housing from the inlet end to the outlet end.

The fiber housing may have the form of a tube-like member, but it should be understood that the fiber housing may have any convenient form. Thus, at least part of the fiber housing may have a cross sectional geometric shape which is substantially equal to a shape selected from the group comprising: a circle, an oval, an ellipse, a drop, and a polygon. Here, the polygon shape may be selected from the group comprising: a triangle, a rectangle, a pentagon, a hexagon, a heptagon, and an octagon.

According to a preferred embodiment of the invention, the compression tool may be adapted to create a pressure on a part or a portion of the outer surface of the flexible membrane, where the part or portion has a dimension or dimensions in the longitudinal direction of the fibers being smaller than the total length of the fibers within the fiber housing. Here, the dimension of the pressure part or portion in the longitudinal direction of the fibers may preferably be below 0.8 times the total length of the fibers within the fiber housing, such as below 0.6 times, such as below 0.5 time, such as below 0.4 times, such as below 0.2 times, or such as below 0.1 times.

It is also within a preferred embodiment to have the compression tool being adapted to create a pressure on a part or a portion of the outer surface of the flexible membrane, where the part or portion is at least partly covering an outer circumference of the membrane. Here, the pressure part or portion may be only partly covering an outer circumference of the membrane. Thus, the pressure part or portion may be covering below 90% of an outer circumference of the membrane, such as below 80%, such as below 70%, such as below 60%, such as below 50%, such as below 40%, such as below 30%, or such as below 20%. It should be understood that by only providing a pressure on a part of the outer surface of the flexible membrane, the interspaces of the uncompressed parts of the fibers will be larger than the interspaces of the compressed part of the fibers. Here, the filtered particles will be left in the interspaces of the uncompressed part of the fibers in the inlet end, and the filtering efficiency may to a great extent be controlled by the dimensions of the part of the flexible membrane on which a pressure is provided.

It is preferred that the location at which the fibers are compressed is a predetermined location. Here it should be noted that the distance from the inlet end of the fiber housing to the location of compression, and also the distance from the outlet end of the fiber housing to the location of compression will also have an influence on the filtering performance. Different arrangements of the location of compressing may be used, but the distance from the inlet end of the fiber housing to the location may be at least 25% of the total length of the fiber housing, such as at least 33%, such as at least 40%, such as at least 50%, such as at least 55%, such as at least 60%. In a preferred embodiment the centre of the location of compressing is arranged with a distance from the inlet end of about ⅔ of the total length of the fiber housing, leaving a distance of about ⅓ of the total length of the fiber housing to the outlet end.

It should be understood that different lengths of the distance from the inlet end to the outlet end of fiber housing may be used, However, it will be most convenient to use a length defined by the length of commercially available fibers or bundle of fibers. Thus, the distance between the at least one inlet and the at least one outlet may be between 10 cm and 200 cm, such as between 30 cm and 150 cm, such as between 40 and 80 cm. If a bundle of fibers having a length of about 60 cm is used, a preferred distance between the at least one inlet and the at least one outlet may be between 50 and 70 cm, or about 60 cm.

The distance between the at least one inlet and the location of compression may be selected accordingly. Thus, the distance between the at least one inlet and the location may be between 5 cm and 100 cm, such as between 10 cm and 90 cm, such as between 20 and 80 cm, such as between 30 and 50 cm, such as around 40 cm.

The distance between the at least one inlet and the at least one outlet may in accordance with another embodiment be between 10 cm and 60 cm, such as between 20 cm and 40 cm, such as between 25 and 35 cm. Here, a plurality or a bundle of fibers having a length around 30 cm may be used.

Again the distance between the at least one inlet and the location of compression may be selected accordingly to be between 5 cm and 80 cm, such as between 10 cm and 60 cm, such as between 15 and 30 cm, such as around 20 cm.

The compression tool may create the pressure on the outer surface of the flexible membrane in different ways. In a preferred embodiment of the invention, the compression tool is a pressure chamber, wherein an inner wall of the pressure chamber may be formed of at least part of the flexible membrane of the fiber housing. The pressure chamber may have one or more inlets/outlets providing a pressurizing aperture and a release aperture. In another preferred embodiment of the invention the pressure is created through one or more substantially solid compressing member(s) being in contact with the outer surface. The compressing member(s) may have non-flexible and/or flexible part(s), but it is preferred that the compressing member(s) may be at least partly flexible or yielding. It should however be noted that by using such substantially solid compressing member(s) a much more simple construction may be achieved than when creating the pressure on the membrane by use of a gas, a liquid or a fluid. The compression tool may preferably be adapted to vary or control the pressure created thereby, so as to thereby vary or control the total cross-section area of the flow passages at the location and so as to vary the minimum size of particles being filtered through the fibers.

The compression tool may comprise a clamp. The compression tool may further or alternatively comprise at least two blocks being positioned on opposite sides of the flexible membrane, so as to compress the fibers from two sides.

It is preferred that the compression tool comprises hydraulics for creating and/or controlling the pressure. Preferably, the compression tool is adapted to compress the plurality of fibers in a radial direction with a pressure of between 1-20 bar, such as between 3-15 bar, such as between 5-10 bar.

The fiber housing may be made of different materials with different flexibility. However, it is preferred that the fiber housing is made of the same material in all its length, whereby the fiber housing is formed of a flexible membrane in substantially all its length. The fiber housing may be made of any suitable material, but it is preferred that the material is watertight and it is further preferred that the material is selected from a group comprising: PE (polyethylene), softened PVC (polyvinyl chloride), nylon, PTFE, and rubber. Here, the rubber material may be EPDM-rubber.

According to an embodiment of the present invention, the fiber housing is arranged within a holding member. Here, the holding member may be made of a substantially solid material, such as for example stainless steel. The holding member may preferably have one or more openings in order to allow the compression tool to create a pressure on the outer surface of the flexible membrane of the fiber housing. Thus, the holding member may have two openings for allowing the compression tool to create a pressure on the outer surface of the flexible membrane. The holding member may preferably be formed as a tube-like member.

The holding member may be formed to have a fluid inlet being sealingly connected to the inlet end of the fiber housing, and a fluid outlet end being sealingly connected to the outlet end of the fiber housing.

In order to maintain a desired filtering operation of the device of the present invention, a longitudinal tension may be applied to the fibers when arranged in the fiber housing. Thus, the filtering device may be constructed and arranged to maintain a longitudinal tension in the fibers. Tension may be maintained by fastening of the fibers within the fiber housing and the arrangement of the fiber housing within the holding member.

Any suitable inner diameter of the fiber housing may be selected. However, it will be most convenient to select a diameter which will fit to the diameter of commercially available bundle of fibers. Preferably, the inner diameter of the fiber housing may be between 1 cm and 20 cm, such as between 2 cm and 15 cm, such as between 3 cm and 10 cm, such as between 4 cm and 8 cm, such as around 5 cm.

Different types of fibers may be used for the filtering device, where the type of fibers may be selected in order to fulfill the requirements of a given filtration process. Thus, the fibers may be porous or non-porous, the fibers may be solid or hollow, and the fibers may comprise transparent fibers. In a preferred embodiment the fibers comprise polyester fibers or nylon fibers. It is also preferred that the fibers have a substantially circular cross-section. Here the cross-sectional dimension may vary according to the particles to be filtered from the fluid, but it is preferred that the diameter is of at most 5 mm, such as at most 2 mm, such as in the range of 0.001-1 mm, such as in the range of 0.01-0.5 mm.

When using hollow fibers, the fibers may preferably be closed at the fiber ends. Here, at least part of the fiber ends may be arranged in the same end of the fiber housing as an inlet to the fiber housing.

When arranging the fibers in the fiber housing it is preferred that the fibers at the inlet end of the fiber housing are attached to an end part of the fiber housing. Here, the fibers at the inlet end of the fiber housing may be glued to the end part or glued to a holding member, which is arranged at the end part. The fibers may be glued by epoxy. In a preferred embodiment, the fibers have free fiber ends at the opposite end of the inlet end of the fiber housing. However, the present invention also covers an embodiment in which the fibers, in their respective ends, are attached to an end part of the fiber housing. Also here, the fibers may be glued to the end parts or to holding members arranged at the end parts by epoxy.

According to an embodiment of the present invention the plurality of fibers within the fiber housing may comprise a bundle of fibers being bent so that a resulting length of the bent bundle of fibers is approximately between ⅓ and ⅔ of the length of the non-bent fibers, preferably around half the length of the non-bent bundle of fibers. Here, the bent end part of the bent bundle of fibers may be arranged in the outlet end of the fiber housing. However, the invention also covers embodiments where the bent end part of the bent bundle of fibers are arranged in the inlet end of the fiber housing.

When the bent end part of the bent bundle of fibers is arranged in the outlet end of the fiber housing, the fibers may be arranged and bent around a cross-shaped element arranged at the outlet end of the fiber housing. However, in a preferred embodiment the two members of the cross are arranged at a distance to each other, whereby about half of the bent fibers will be arranged at a first distance to the outlet end and the remaining fibers will be arranged at a second distance to the outlet end.

Although it may be preferred to have a single location of compression of the fibers, it is also within the scope of the present invention to have the compression tool adapted to compress the fibers at several locations along the length of the fibres. Hereby the capacity of accumulation of filtered particles may be changed or controlled along the length of the fiber housing.

The filtering device of the first aspect of the present invention may be used for filtration when arranged in a filtration system. Thus, according to a second aspect of the present invention there is provided a system for filtering a fluid, the system including: a filtering device according to any of the embodiments of the first aspect of the invention, a pump to pass a fluid to be filtered through the flow passages of the compressed fibers, and a compression tool to maintain the fibers in a compressed condition while passing the fluid through the flow passages.

This system may further comprise values to release the pressure on the outer surface of the flexible membrane thereby leaving the fibers in an uncompressed condition, and an inlet to pass a liquid and/or a gas through the uncompressed fibers in a direction from the inlet towards the outlet or in an opposite direction, so as to forward flush or backward flush the device.

Here, the liquid to be passed through the uncompressed fibers so as to flush the fibers may be unfiltered fluid, but it may also be another liquid such as tap water. If a gas is used for the flushing, the gas may be compressed air.

In a preferred embodiment of the filtering system, the compression tool, the valves, the pump, and the inlet are computer controlled.

It is also within the scope of the present invention to provide a method of filtering a fluid. Thus, according to a third aspect of the present invention, there is provided a method for filtering fluids through a device or a system according to any of the embodiments of the first and the second aspects of the present invention, the method including: passing the fluid through the device, compressing the fibers in a radial direction at a location along the flexible membrane, so as to reduce the total cross-sectional area of the fibers and thereby the cross-sectional area of the flow-passages, whereby the cross-sectional areas of the flowpassages gradually decrease towards the location, and maintaining the pressure on the fibers while passing the fluid through the flowpassages.

The above method may also further comprise the step of transmitting ultraviolet light across the fibers, so as to kill bacteria and/or viruses in the filtered particles by use of ultraviolet light.

It is further within the scope of the present invention to provide a method of flushing a filtering device. Thus, according to a fourth aspect of the invention, there is provided a method of flushing a device or a system according to any of the embodiments of the first and second aspects of the present invention, the method including releasing the pressure on the fibers, and passing liquid or gas through the uncompressed fibers. Here, the liquid or gas may pass the uncompressed fibers in a direction from the inlet towards the outlet or in an opposite direction, so as to forward flush or backward flush the device.

Other objects, features and advantages of the present invention will be more readily apparent from the detailed description of the preferred embodiments set forth below, taken in conjunction with the accompanying drawings.

DETAILED DESCRIPTION

Figure 1:
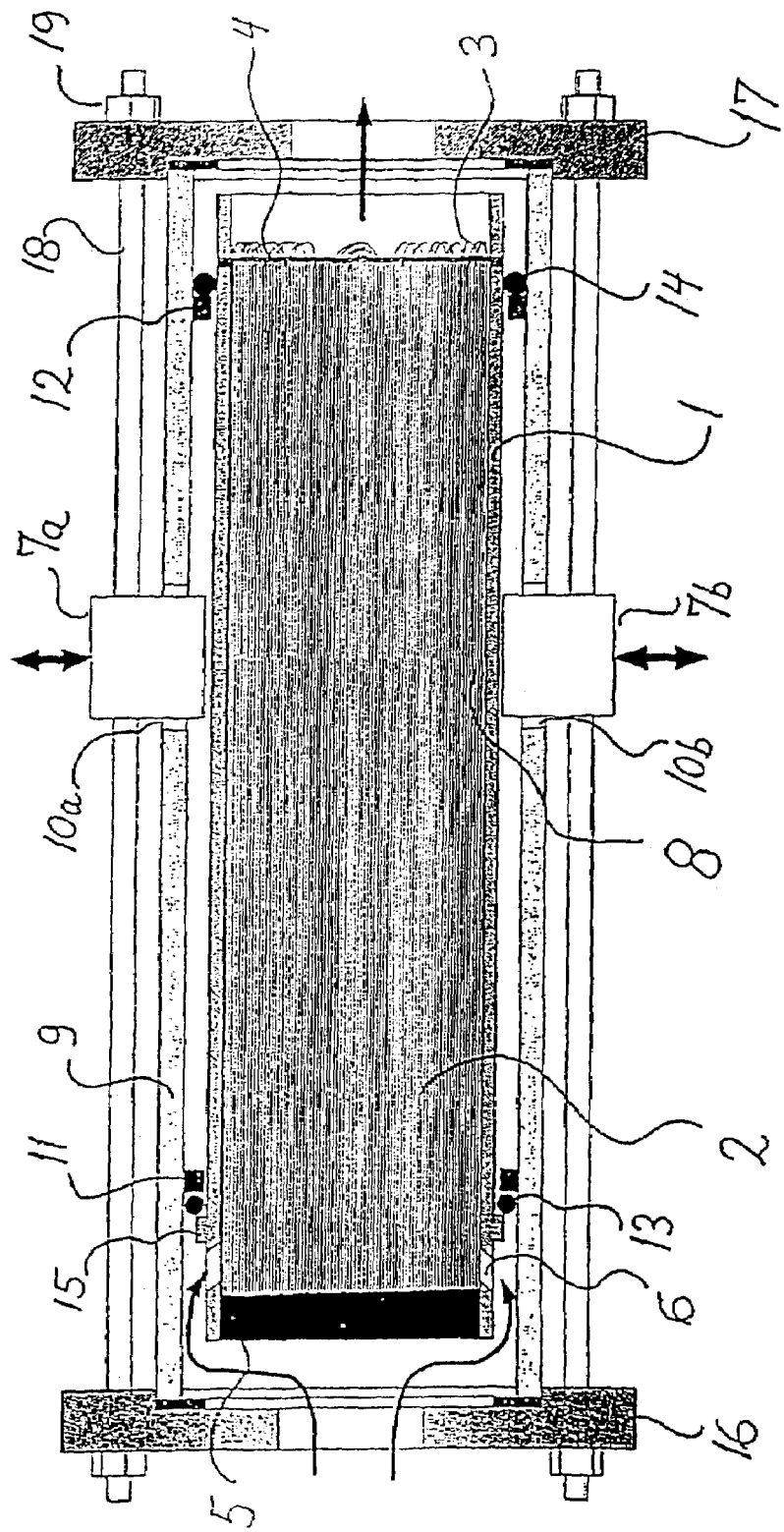
FIG. 1 is a longitudinal section view of a first embodiment of a filtering device according to the present invention.

In FIG. 1 is shown a longitudinal section view of an embodiment of a filtering device according to the present invention. The filtering device of FIG. 1 comprises a fiber housing 1 having the form of a tube. Here, the fiber housing 1 is made of a flexible, watertight material in all the housing length, whereby the fiber housing is formed as a flexible membrane surrounding a bundle of fibers 2. The bundle of fibers 2 comprises a plurality of fibers extending longitudinally in the fiber housing 1.

In the illustrated embodiment the fibers are bent to thereby obtain a bundle of bent or folded fibers 2 having a length being about half the length of the non-bent fibers. The bent end of the fibers is arranged in an outlet end 3 of the fiber housing 1. Here the fibers may be bent around a cross 4 secured to the fiber housing 1 by gluing with, for example, epoxy. The free ends of the fibers are arranged in an inlet end 5 of the fiber housing 1. Here, it is preferred that the fibers are glued to the inlet end 5 by epoxy resulting in a watertight end surface at the inlet end 5. The bundle of fibers 2 should be substantially equally spaced when arranged in the epoxy of the inlet end 5 in order to obtain a number of substantially equally sized interspaces defining flow passages. A number of inlets 6 are arranged in the sidewall of the fiber housing 1 near the inlet end 5, whereby a fluid can be conducted into the fiber housing 1. The fiber housing 1 is open at the outlet end 3, whereby the fluid can be discharged from the fiber housing 1.

In the illustrated embodiment of FIG. 1, the fiber housing 1 is made of a flexible material such as softened PVC or PVC-flexible, and the side-wall of the fiber housing has a thickness of about 5 mm and the inner diameter of the fiber housing is about 50 mm, giving an outer diameter about 60 mm. The cross 4 is made of stainless steel and has a diameter of 2 mm. The fibers may for example be hollow fibers of TYNEX® nylon (available from the DuPont Company) with an unfolded length of 600 mm and a diameter of about 0 15 mm. However, solid fibers may also be used. Thus, the bent or folded length of the fibers in the bundle 2 will be about or a little less than 300 mm. The length of the fiber housing will then be about or a little more than 300 mm. It should be noted that the fiber housing 1 may also be made of a rubber material such as EPDM-rubber.

When the fibers are in an uncompressed condition the interspaces between the fibers are defined by the arrangement of the fibers at the inlet end 5 and the arrangement of the fibers around the cross 4 at the outlet end 3. Due to the arrangement around the cross 4, the size of the interspaces and thereby the flow passages may vary slightly from the inlet end 5 to the outlet end 3. It is also within the scope of the present invention to have the two members of the cross 4 separated from each other with a distance around 20 mm.

It is to be understood that the minimum size of particles to be filtered from a fluid is a function of the diameter of the fibers and the packing or cross-sectional density of the fibers. Thus, the filtered particle size decreases with a decreasing fiber diameter. Although it is preferred to have a relatively high density of fibers it is important that the cross-sectional area of the flow passages is larger at a distance from the location of the compressed fibers than at the location in order to avoid clogging.

When using the filtering device of FIG. 1 for fluid filtration the flexible membrane surrounding the fiber bundle 2 may be compressed at a radial direction at a location along the housing 1. Hereby the total cross-sectional area of the interspaces between the fibers and thereby the cross-sectional area of the flow passages is reduced at the location with the cross-sectional areas of the flow-passages being gradually decreased towards this location. Thus, the cross-sectional area of the flow passages and thereby the filtering effect may be varied by varying the external pressure on the flexible membrane.

In order to compress the fibers of the fiber bundle 2, the filtering device of FIG. 1 comprises a compression tool in the form of a clamp having two curved jaws 7a, 7b. Here the jaws 7a, 7b are made of stainless steel having a coating of softened PVC on the surfaces for contacting the flexible membrane of the fiber housing 1. When the jaws 7a, 7b are pressed against the fiber housing 1, the fibers are compressed and the filtering device can be used for filtration of the fluid. When the fluid is conducted through the fiber housing the filtered particles will be deposited in the inlet side of the fiber housing 1 between the inlets 6 and the location 8 of the compressed fibers.

In order to obtain sufficient space for the deposited particles and in order to avoid an early clogging of the filtering device, the jaws 7a, 7b and thereby the location of compressing 8 is preferably arranged so that about ⅔ of the length of the fiber housing is on the inlet side of the jaws 7a, 7b and about ⅓ of the length of the fiber housing is on the outlet side of the jaws 7a, 7b. For the filtering device of FIG. 1 the width of the jaws 7a, 7b is about 25 mm. The contacting surfaces of the jaws 7a, 7b are formed so that each surface covers about ⅓ of the outer diameter or circumference of the uncompressed fiber housing 1.

The jaws or blocks 7a, 7b of the compression tool may be controlled manually or by hydraulics. When using hydraulics the pressure of the compression tool may be controlled electronically by use of, for example, a computer. For the filtering device of FIG. 1 filtration processes have been carried out with a pressure around two tons on the jaws 7a, 7b, whereby the fiber bundle 2 is compressed.

In order to support or hold the fiber housing 1 of FIG. 1 a holding member 9 is provided. The holding member has the form of a tube with a fluid inlet end and a fluid outlet end and with two oppositely arranged openings 10a, 10b allowing the jaws 7a, 7b to compress the flexible membrane of the fiber housing 1. The holding member 9 has a first inner collar 11 at the inlet end and a second inner collar 12 at the outlet end, with a first O-ring 13 being arranged around the fiber housing 1 at the inlet end 5 and being in sealing engagement with the first inner collar 11, and with a second O-ring 14 being arranged around the fiber housing 1 at the outlet end 3 and being in sealing engagement with the second inner collar 12. In the embodiment shown in FIG. 1 there is also formed an outer collar 15 at the inlet end 5 of the fiber housing 1, whereby the first O-ring 13 is placed between the outer collar 15 and the first inner collar 11. The holding member 9 further has an inlet flange 16 arranged at the fluid inlet end and an outlet flange 17 arranged at the fluid outlet end. The flanges 16,17 are secured to the holding member 9 with bolts 18 and corresponding nuts 19.

The inlet flange 16 is dimensioned to fit a fluid inlet pipe, and the outlet flange 17 is dimensioned to fit a fluid outlet pipe.

For the filtering device of FIG. 1, the inlet and outlet pipes are ¾" pipes, and the holding member 9 is made of stainless steel with an outer diameter of 100 mm and a length around 360 mm.

When using softened PVC for the fiber housing 1, the stiffness of the housing 1 will be large enough to ensure a sealing engagement between the inner collar 12 and the O-ring 14. This sealing engagement is further amplified by the pressure of the fluid inside the fiber housing 1. However, if a rubber membrane is used for the fiber housing 1 it may be necessary to reinforce the outlet end 3 of the fiber housing 1.

Figure 2:
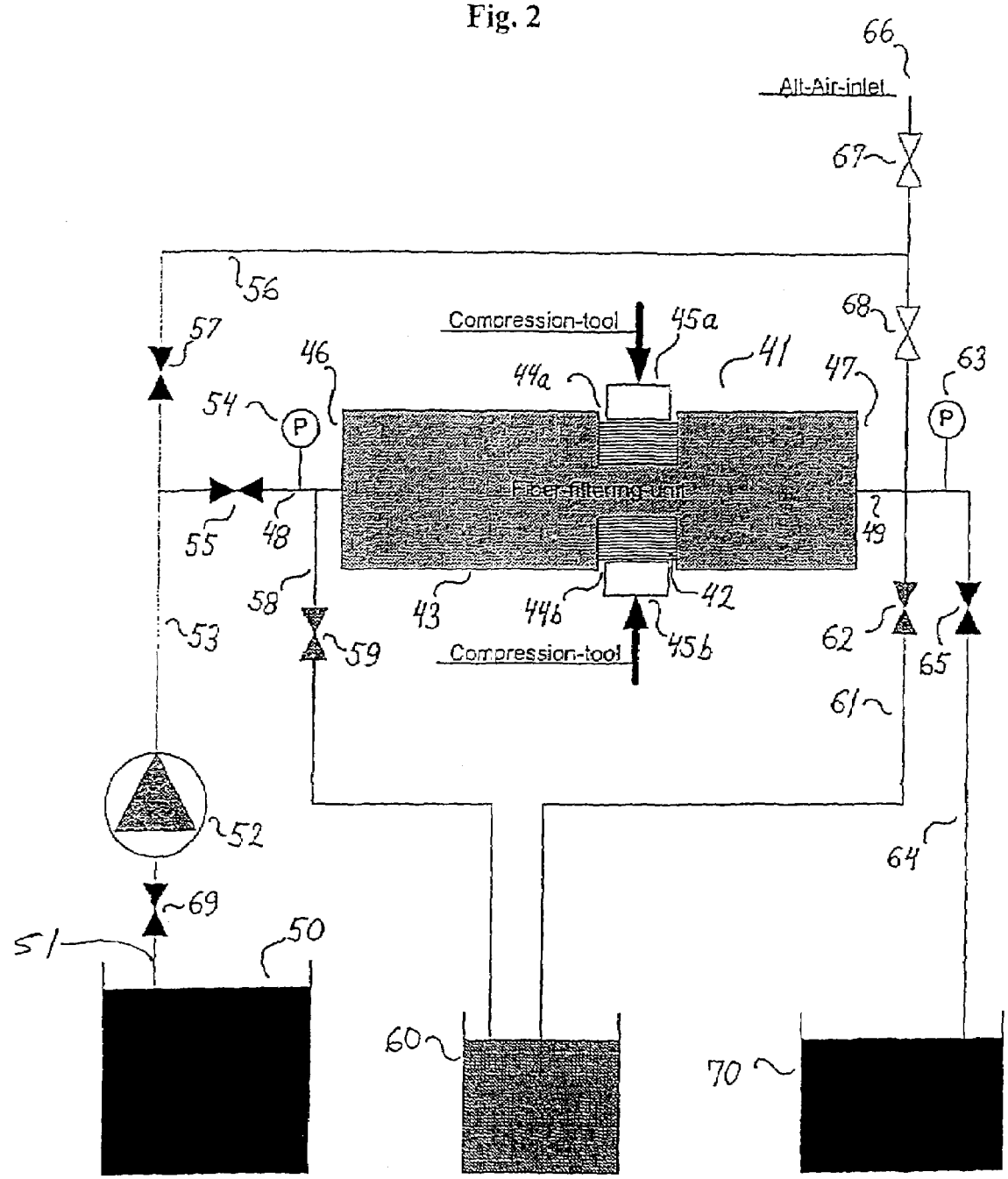
FIG. 2 is a block diagram showing a filtering system using a filtering device according to the present invention.

It should be understood that a major advantage of a filtering device according to the present invention is the possibility of flushing the fibers when the pressure on the fibers is released. The flushing process may be either a forward flushing or a backward flushing process. This is illustrated in FIG. 2 which is a block diagram showing a filtering system using a filtering device according to the present invention. The filtering device may preferably be the device shown in FIG. 1, but any other filtering device according to the present invention may be used.

The system of FIG. 2 comprises a filtering device 41 according to the present invention. The filtering device 41 has a fiber housing 42 within a holding member 43 having openings 44a, 44b for compression tool 45a, 45b, which compression tool can create a pressure on a flexible membrane of the fiber housing 42. The filtering device 41 further has a fluid inlet end 46 and a fluid outlet end 47 for connecting to fluid inlet and outlet pipes 48, 49, respectively.

The system of FIG. 2 further comprises a container for unfiltered fluid 50, with a pipe 51, which via a valve 69 is connected to a pump 52 for providing a predetermined fluid pressure. A pipe 53 is leading the fluid through a valve 55 to the fluid inlet pipe 48 having a pressure gauge 54. Before the valve 55 a pipe 56 is connected to the pipe 53 via a valve 57, with the other end of the pipe 56 being connected to the fluid outlet pipe 49. The fluid inlet pipe 48 is connected to a pipe 58, which via a valve 59 leads to a container 60 for containing filtered particles or deposit being removed from the fiber housing during a flushing process. The fluid outlet pipe 49 is further connected to a pipe 61, which via a valve 62 leads to the deposit container 60. The fluid outlet pipe 49 also has a pressure gauge 63, and after the connections to pipes 56 and 61, the fluid outlet pipe 49 is connected to a pipe 64, which via a valve 65 conducts the filtered fluid to a container for filtered fluid 70.

In FIG. 2 is also shown an inlet 66 which via a valve 67 is connected to the pipe 56. Furthermore a valve 68 is inserted in the pipe 56 before the connection to the fluid outlet pipe 49. The inlet 66 may be used for injecting or conducting a liquid, air or a gas into the system to be used for a flushing process. The liquid, air or gas should have a pressure being high enough to flush the system.

When the system of FIG. 2 is operating in a filtering mode, the compression tool 45a, 45b is providing a predetermined pressure on the fibers within the fiber housing, the valves 69, 55 and 65 are open, the valves 57, 59, 62, 67 and 68 are closed, and the pump 52 is providing a predetermined fluid inlet pressure. This pressure may for example be up to 20 bar, such as up to 10 bar, such as in the range of 5-10 bar. When the filtration process has been going on for some time, the fiber within the fiber housing 42 may need to be flushed.

If a forward flushing using fluid is wanted, the pump 52 may be turned off, the valves 69, 55 and 65 are closed while maintaining the valves 57, 59, 62, 67 and 68 in the closed position, the compression tool 45a, 45b is released, then the valves 62, 69 and 55 are opened and the pump 52 is turned on again. This will conduct unfiltered fluid through the uncompressed fibers of the fiber housing 42 and through the pipe 61 to the deposit container 60.

If a backward flushing using fluid is wanted, the pump 52 may be turned off, the valves 69, 55 and 65 are closed while maintaining the valves 57, 59, 62, 67 and 68 in the closed position, the compression tool 45a, 45b is released, then the valves 69, 57, 68 and 59 are opened and the pump 52 is turned on again. This will conduct unfiltered fluid through the pipe 56, backwards through the uncompressed fibers of the fiber housing 42, and through the pipe 58 to the deposit container 60.

If a forward flushing using inlet 66 is wanted, the pump 52 may be turned off, the valves 69, 55 and 65 are closed while maintaining the valves 57, 59, 62, 67 and 68 in the closed position, the compression tool 45a, 45b is released, then the valves 62, 67, 57 and 55 are opened. This will conduct liquid, air or gas from inlet 66 through the uncompressed fibers of the fiber housing 42 and through the pipe 61 to the deposit container 60.

If a backward flushing using inlet 66 is wanted, the pump 52 may be turned off, the valves 69, 55 and 65 are closed while maintaining the valves 57, 59, 62, 67 and 68 in the closed position, the compression tool 45a, 45b is released, then the valves 67, 68 and 59 are opened. This will conduct liquid, air or gas from inlet 66 through the pipe 56, backwards through the uncompressed fibers of the fiber housing 42, and through the pipe 58 to the deposit container 60.

Usually, a backward flushing process is used in order to avoid any further contamination of the system by filtered particles.

It should be understood that it is also within the present invention to provide a filtering system which is automatically operated by a computer, such as a programmable logic controller, PLC. Here, the computer may be programmed to control the compressing and the release of the pressure by use of, for example, hydraulics. Predetermined pressures and time intervals may be programmed into the computer in order to control such a process. The computer may further be programmed to control the fluid pump 52 and the valves 55, 57, 59, 62, 65, 67 and 68 to be active and non-active at predetermined time intervals.

In Table 1 is listed the results from a filtration process which used the filtering device of FIG. 1. The fluid to be filtered had a fluid inlet pressure about 2.5-3 bar, and the compression tool was compressed around the fiber housing with a pressure about 2 tons. The fiber bundle of the fiber housing comprised hollow polyester fibers with a diameter about 0.05 mm.

The filtered fluid was ash-contaminated water, where ordinary drinking water was mixed together with ashes from wood. This mixture was measured to consist of water and 95 mg/l soluble solid (dry material). When passed through the filter, there was no more measurable amount of soluble solid in the filtered fluid. The low limit of the apparatus for measuring the soluble solid was 3 mg/l, so from the results it is concluded that more than 96% of the soluble solid was filtered out of the water.

The reason for testing the filtering device with this kind of fluid was that this kind of pollution has a wide and natural range of particle sizes.

The fluid to be filtered had following mixture of particle sizes:

TABLE I

| Particle sizes:<br>All in (um) | Amount in % of<br>dry material of soluble<br>solid before filtering. | Amount in % of<br>dry material or soluble<br>solid after filtering. |
| --- | --- | --- |
| 0.49 to 0.91 | 1.66 | 0 |
| 0.91 to 1.95 | 2.52 | 0 |
| 1.95 to 4.19 | 4.63 | 0 |
| 4.19 to 9.00 | 13.3 | 0 |
| 9.00 to 19.31 | 34.69 | 0 |
| 19.31 to 41.43 | 35.15 | 0 |
| 41.43 to 88.91 | 7.81 | 0 |
| 88.91 to 120.76 | 0.24 | 0 |

The analysis was run by the VKI-institute, certified in DK- by No. DANAK- Reg. No. 26 on a Mastersizer S long bed Ver. 2.18 instrument from Malvern Instruments Ltd.

Figure 3:
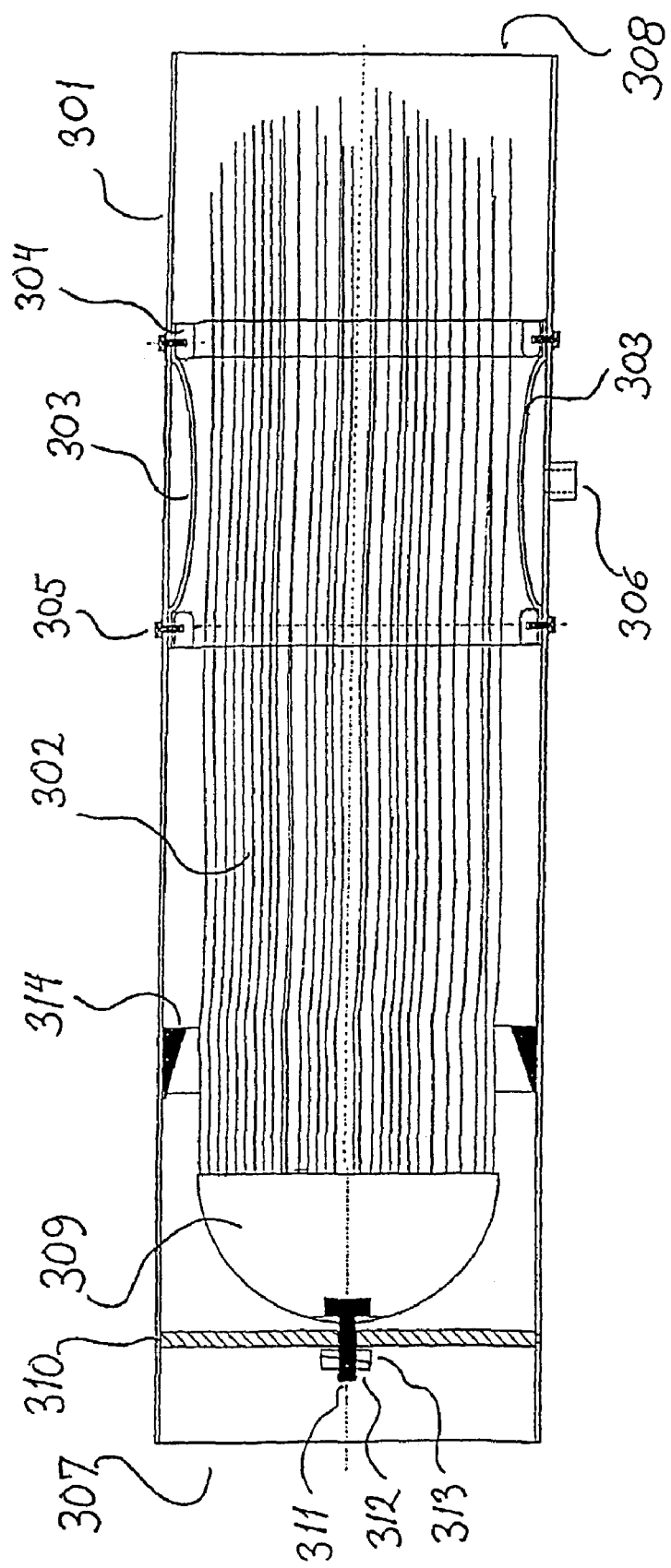
FIG. 3 is a longitudinal section view of a second embodiment of a filtering device according to the present invention.

A second embodiment of a filtering device according to the present invention is illustrated in FIG. 3. The device of FIG. 3 comprises a fiber housing 301 having the form of a tube. Here, the outer part of the fiber housing 301 is made of a watertight material, which is solid in all the housing length and surrounding a bundle of fibers 302. The bundle of fibers 302 comprises a plurality of fibers extending longitudinally in the fiber housing 301. For this embodiment of the invention, the inner part of the fiber housing 301 comprises a compression membrane, liner or bellow 303, which is arranged at a location inside the fiber housing 301 and surrounding the fibers 302. The compression membrane 303 is made of a flexible material and sealing connected to the inner wall of the housing 301 by mounting and seal rings 304 and mounting bolts 305. A hydraulic inlet/outlet opening 306 is arranged in the housing 301 for providing and/or controlling a hydraulic pressure whereby the compression membrane 303 may be compressed against the bundle of fibers 302.

In the illustrated embodiment the fiber housing 301 has an inlet end 307 and an outlet end 308, and the fibers 302 have free fiber ends at the outlet end 308. At the inlet end 307 the fibers are secured to a fiber-head 309, and it is preferred that the fibers 302 are glued to the fiber-head 309 by epoxy. The bundle of fibers 302 should be substantially equally spaced when arranged in the epoxy of the fiber-head 309 in order to obtain a number of substantially equally sized interspaces defining flow passages. One or more liquid or fluid inlets may be arranged at or around the inlet end 307 of the fiber housing 301, whereby a liquid or a fluid can be conducted into the fiber housing 301. The fiber housing 301 has one or more liquid or fluid outlets at the outlet end 308, whereby the liquid or fluid can be discharged from the fiber housing 301. The fiber-head 309 is fastened to a fiber-head mounting 310, which is secured to the fiber housing 301, and the liquid or fluid may pass from the inlet(s) through the mounting 310, along the fiber-head 309, and then enter into the bundle of fibers 302 along the outer side of the bundle 302. When a liquid is introduced into the bundle of fibers 302, the fibers may be pressed against the fiber housing 301 and the compression membrane 303, whereby the liquid will have to pass through interspaces being provided between the fibers before leaving the fiber housing 301 through the liquid outlet(s).

The fiber-head 309 may be secured to the mounting 310 via a head-bolt 311 having a flush-nut 312 resting on a flush-ring 313. A free-space is provided around the head-bolt 311 within the mounting 310, and a flush-space is provided between the mounting 310 and the fiber-head 309. It is preferred that a ring 314 for providing a turbulent liquid flow, such as for example during a flushing process, is arranged at the inner wall of the housing 301.

It is preferred that the flush-ring 313 has a variable thickness or height and that the flush-nut 312 is dimensioned to fit to the variable height of the flush-ring. Thus, if the fiber head 309 is turned or twisted during, for example, a flushing process, the fiber head 309 may be moved to and fro in the direction against the mounting 310. The fiber-head 309 may be twisted due to a turbulent liquid flow, which may be provided by the ring 314.

For the illustrated embodiment of FIG. 3, the fiber housing 301 and the mounting 310 may be made of stainless steel while the compression membrane 303 may be made of a flexible material such as softened PVC or PVC- flexible or rubber. The inner diameter of the fiber housing may in a preferred embodiment be about 100 mm, and the diameter of the fiber-head 309 and the bundle of fibers 302 may be around 76 mm. In one embodiment the fibers are hollow fibers of nylon with a length around 400 mm and a fiber diameter of about 6 mm. The total length of the fiber housing 301 may be 500 mm. Solid fibers may also be used, an in one embodiment solid fibers with a diameter of 2.5 mm are used.

It should be understood that a major advantage of a filtering device according to the present invention is the possibility of flushing the fibers when the pressure on the fibers is released. The flushing process may be either a forward flushing or a back ward flushing process. A system, which is capable of performing a forward flushing process is illustrated in FIG. 4, which is a block diagram showing a system using the filtering device of FIG. 3.

Figure 4:
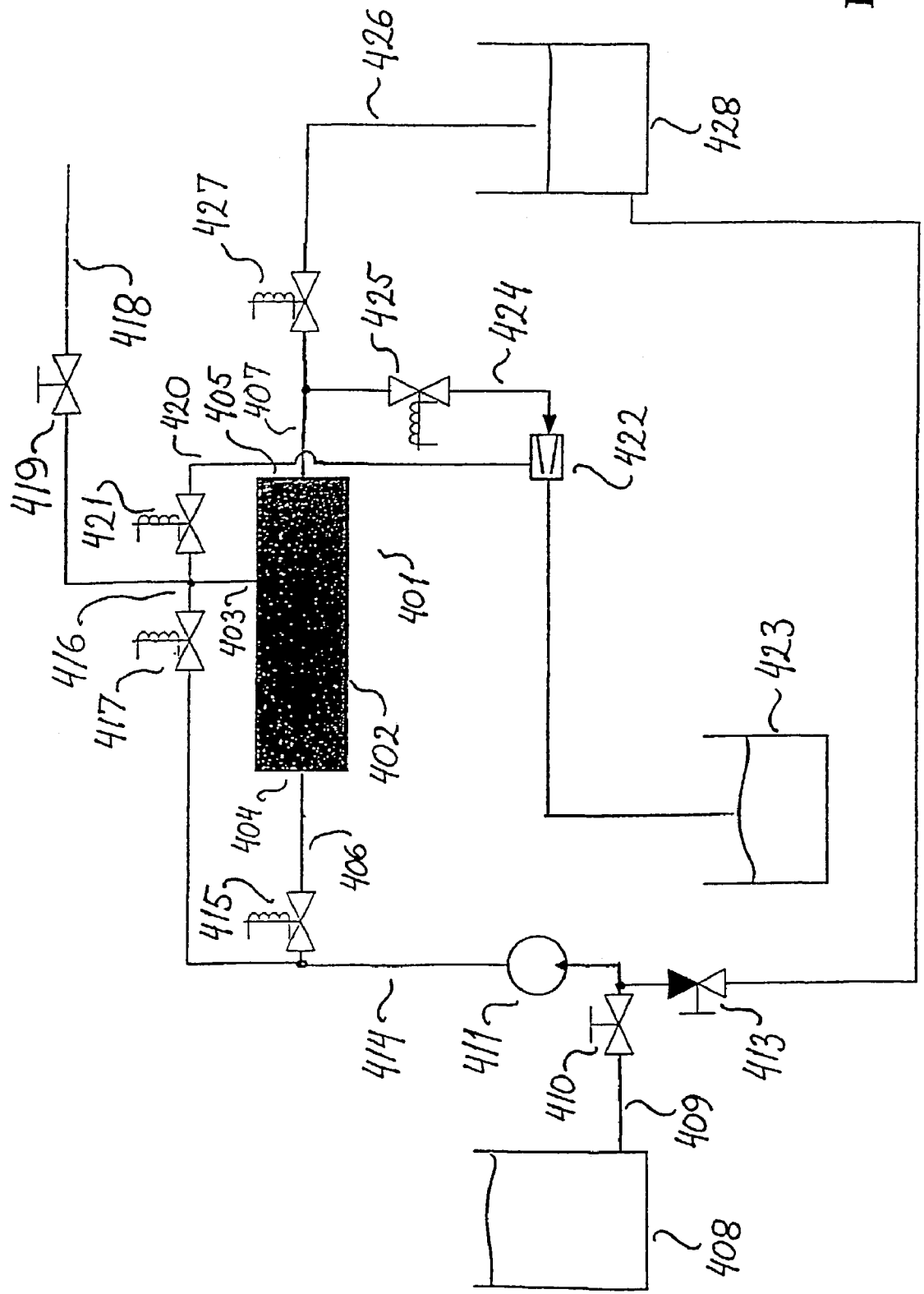
FIG. 4 is a block diagram showing a second embodiment of a system using a filtering device according to the present invention.

In the system of FIG. 4 the filtering device 401 has a fiber housing 402 having a hydraulic inlet/outlet opening 403 leading to compression membrane inside the housing for compressing the fiber bundle inside the fiber housing 402. A fluid or gas may be introduced at a certain pressure via the opening 403 in order to compress the fibers. The device 401 further has a liquid or fluid inlet end 404 and a liquid or fluid outlet end 405 for connecting to liquid or fluid inlet and outlet pipes 406, 407, respectively.

The system of FIG. 4 further comprises a container for unfiltered liquid or fluid 408, with a pipe 409, which via a liquid valve 410 is connected to the inlet side of a pump 411 for providing a predetermined fluid or liquid pressure. Furthermore, at recirculation valve 413 is connected at the inlet side of the pump 411. When the liquid valve 410 is open, the recirculation valve 413 is closed and the pump 411 is on, the liquid or fluid is provided at a certain pressure at the outlet side of the pump 411.

From the outlet side of the pump 411 a pipe 414 leads the fluid or liquid through a valve 415 to the fluid or liquid inlet pipe 406. Before the valve 415 a pipe 416 is connected to the pipe 414 via a compression valve 417, with the output of the valve 417 being connected to the opening 403. The opening 403 is also connected to an external control pipe 418 via an external control valve 419 and to a pipe 420 via a decompression valve 421. The pipe 420 is connected to an injector 422.

The output of the injector 422 leads to a container 423 for containing filtered particles or deposit being removed from the fiber housing 402 during a flushing process. The liquid or fluid outlet pipe 407 is further connected to the injector 422 via a pipe 424 and a forward flush valve 425. The liquid or fluid outlet pipe 407 is connected to a pipe 426, which via a valve 427 conducts the filtered liquid or fluid to a container 428 for filtered liquid or fluid.

The compression of the fibers may be controlled externally by adjusting the hydraulic pressure via the external control pipe and valve 419. When operating in this mode, the valves 417 and 421 are closed. When decompressing the compression membrane, the decompressing may take place via the valve 419 or by opening the decompressing valve 421. However, it is preferred that the valve 419 is closed and that the compression pressure is controlled via the compression valve 417. Here, valves 415, 413, 419 and 421 are closed while valve 410 and 417 are open and untreated fluid or liquid is pumped by the pump 411 via pipe 416 into the compression membrane via the opening 403. When a desired pressure has been obtained, valve 417 is closed, and the system may be used for normal operation.

During normal operation, valves 413, 417, 419, 421 and 424 are closed, while valves 410, 415 and 427 are open. The pump 411 provides a predetermined fluid or liquid inlet pressure. This pressure may for example be up to 20 bar, such as up to 10 bar, such as in the range of 5-10 bar, or such as in the range of 4-6 bar. When the process has been going on for some time, the fibers within the fiber housing 402 may need to be flushed.

If a forward flushing using fluid is wanted, the pump 411 may be turned off, the valves 410, 415 and 427 are closed, and valves 413, 417 and 419 are maintained closed, the decompression valve 421 and the forward flush valve 425 are opened, then the valves 410, 415 are opened and the pump 411 is turned on again. This will conduct unfiltered fluid forwards through the fibers while at the same time decompressing the fibers by having the injector 422 remove the compression fluid or liquid via the decompression valve 421. The flushing and compression liquid or fluid is conducted via the injector 422 to the waste or deposit container 423.

It should be understood that it is also within the present invention to provide a system according to FIG. 4 for filtering a liquid or fluid, which system is automatically operated by a computer, such as a programmable logic controller, PLC. Here, the computer may, be programmed to control the pump 411 and the valves to be active and non-active at predetermined time intervals.

While the invention has been particularly shown and described with reference to particular embodiments, it will be understood by those skilled in the art that various changes in form and details may be made therein without departing from the spirit and scope of the invention.

What is claimed is:

1. A device for filtering a fluid, comprising:
   a fiber housing having an inlet end with at least one inlet and an outlet end with at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid,
   wherein at least part of the fiber housing is formed of a flexible membrane surrounding the fibers;
   a compression tool is provided to create a pressure on an outer surface of the flexible membrane thereby compressing the fibers in a radial direction at least one location along the length of the fibers, and
   the distance from the inlet end of the fiber housing to the location at which pressure is created on the flexible membrane is at least 25% of the total length of the fiber housing, wherein the compression tool is adapted to create the pressure on at least a part or a portion of the outer surface of the flexible membrane, the pressure part or portion having a dimension in the longitudinal direction of the fibers below 0.5 times the total length of the fibers within the fiber housing and wherein the fibers have free ends at the end of fiber housing opposite to the inlet end.

2. A device according to claim 1, wherein the fibers at the inlet end of the fiber housing are attached to an end part of the fiber housing.

3. A device according to claim 2, wherein the fibers are glued to the end part by epoxy.

4. A device according to claim 1, wherein the compression tool is provided for creating a variable pressure on an outer surface of the flexible membrane.

5. A device according to claim 1, wherein the fibers at the inlet end of the fiber housing are glued to an end part or glued to a holding member, which holding member is arranged at the end part.

6. A device according to claim 1, wherein the compression tool is adapted to vary the pressure created thereby, so as to thereby vary the total cross-section of the flow passages at the location and so as to vary the minimum size of particles being filtered through the fibers.

7. A device according to claim 1, wherein the distance from the inlet end of the fiber housing to the location of compression of the fibers is at least 33% of the total length of the fiber housing.

8. A device according to claim 1, wherein the distance from the inlet end of the fiber housing to the location of compression of the fibers is at least 40% of the total length of the fiber housing.

9. A device according to claim 1, wherein the distance from the inlet end of the fiber housing to the location of compression of the fibers is at least 50% of the total length of the fiber housing.

10. A device according to claim 1, wherein the distance from the inlet end of the fiber housing to the location of compression of the fibers is at least 55% of the total length of the fiber housing.

11. A device according to claim 1, wherein the distance from the inlet end of the fiber housing to the location of compression of the fibers is at least 60% of the total length of the fiber housing.

12. A device according to claim 1, wherein the distance between the at least one inlet and the location of compression of the fibers is between 5 cm and 100 cm.

13. A device according to claim 1, wherein the distance between the at least one inlet and the location of compression of the fibers is between 10 cm and 90 cm.

14. A device according to claim 1, wherein the distance between the at least one inlet and the location of compression of the fibers is between 20 and 80 cm.

15. A device according to claim 1, wherein the distance between the at least one inlet and the location of compression of the fibers is between 30 and 50 cm.

16. A device according to claim 1, wherein the distance between the at least one inlet and the location of compression of the fibers is around 40 cm.

17. A device according to claim 1, wherein the distance between the at least one inlet and the location is between 5 cm and 80 cm.

18. A device according to claim 1, wherein the distance between the at least one inlet and the location is between 10 cm and 60 cm.

19. A device according to claim 1, wherein the distance between the at least one inlet and the location is between 15 and 30 cm.

20. A device according to claim 1, wherein the distance between the at least one inlet and the location is around 20 cm.

21. A device according to claim 1, wherein only part of the fiber housing in the longitudinal direction of the fibers is formed of a flexible membrane, and wherein the compression tool is adapted to create the pressure on substantially all of the outer surface of the flexible membrane part of the fiber housing.

22. A device according to claim 1, wherein the dimension of the pressure part or portion in the longitudinal direction of the fibers is below 0.4 times the total length of the fibers within the fiber housing.

23. A device according to claim 1, wherein the dimension of the pressure part or portion in the longitudinal direction of the fibers is below 0.2 times the total length of the fibers within the fiber housing.

24. A device according to claim 1, wherein the dimension of the pressure part or portion in the longitudinal direction of the fibers is below 0.1 times the total length of the fibers within the fiber housing.

25. A device according to claim 1, wherein the fiber housing has the form of a tube-like member.

26. A device according to claim 1, wherein at least part of the fiber housing has a cross sectional geometric shape which is substantially equal to a shape selected from the group comprising: a circle, an oval, an ellipse, a drop, and a polygon.

27. A device according to claim 26, wherein the polygon shape is selected from the group comprising: a triangle, a rectangle, a pentagon, a hexagon, a heptagon, and an octagon.

28. A device according to claim 1, wherein the compression tool is adapted to create the pressure on a part or a portion of the outer surface of the flexible membrane, the part or portion at least partly covering an outer circumference of the membrane.

29. A device according to claim 28, wherein the pressure part or portion is partly covering an outer circumference of the membrane.

30. A device according to claim 29, wherein the pressure part or portion is covering below 90% of an outer circumference of the membrane.

31. A device according to claim 29, wherein the pressure part or portion is covering below 80% of an outer circumference of the membrane.

32. A device according to claim 29, wherein the pressure part or portion is covering below 70% of an outer circumference of the membrane.

33. A device according to claim 29, wherein the pressure part or portion is covering below 60% of an outer circumference of the membrane.

34. A device according to claim 29, wherein the pressure part or portion is covering below 50% of an outer circumference of the membrane.

35. A device according to claim 29, wherein the pressure part or portion is covering below 40% of an outer circumference of the membrane.

36. A device according to claim 29, wherein the pressure part or portion is covering below 30% of an outer circumference of the membrane.

37. A device according to claim 29, wherein the pressure part or portion is covering below 20% of an outer circumference of the membrane.

38. A device according to claim 1, wherein the pressure is created on the outer surface of the flexible membrane through one or more substantially solid compressing members being in contact with the outer surface.

39. A device according to claim 1, wherein the location at which the fibers are compressed is a predetermined location.

40. A device according to claim 1, wherein the compression tool comprises a clamp.

41. A device according to claim 1, wherein the compression tool comprises hydraulics to create a pressure.

42. A device according to claim 1, wherein the compression tool is adapted to compress the plurality of fibers in a radial direction with a pressure of between 5-20 bar.

43. A device according to claim 1, wherein the fiber housing is formed of a flexible membrane in substantially all its length.

44. A device according to claim 1, wherein the fiber housing is made of a material selected from a group comprising: PE, softened PVC, nylon, PTFE, and EPDM-rubber.

45. A device according to claim 1, wherein the fiber housing is arranged within a holding member.

46. A device according to claim 45, wherein the holding member is made of a substantially solid material.

47. A device according to claim 46, wherein the holding member is made of stainless steel.

48. A device according to claim 45, wherein the holding member has one or more openings for allowing the compression tool to create a pressure on the outer surface of the flexible membrane of the fiber housing.

49. A device according to claim 48, wherein the holding member has two openings for allowing the compression tool to create a pressure on the outer surface of the flexible membrane.

50. A device according to claim 45, wherein the holding member is formed as a tube-like member.

51. A device according to claim 45, wherein the holding member has an inlet being sealingly connected to the inlet end of the fiber housing, and an outlet end being sealingly connected to the outlet end of the fiber housing.

52. A device according to claim 1, wherein the distance between the at least one inlet and the at least one outlet is between 10 cm and 200 cm.

53. A device according to claim 1, wherein the distance between the at least one inlet and the at least one outlet is between 30 cm and 150 cm.

54. A device according to claim 1, wherein the distance between the at least one inlet and the at least one outlet is between 40 and 150 cm.

55. A device according to claim 1, wherein the distance between the at least one inlet and the at least one outlet is between 10 cm and 60 cm.

56. A device according to claim 1, wherein the distance between the at least one inlet and the at least one outlet is between 20 cm and 40 cm.

57. A device according to claim 1, wherein the distance between the at least one inlet and the at least one outlet is around 30 cm.

58. A device according to claim 1, further comprising means for maintaining a longitudinal tension in the fibers.

59. A device according to claim 1, wherein the internal diameter of the fiber housing is between 1 cm and 20 cm.

60. A device according to claim 1, wherein the internal diameter of the fiber housing is between 2 cm and 15 cm.

61. A device according to claim 1, wherein the internal diameter of the fiber housing is between 3 cm and 10 cm.

62. A device according to claim 1, wherein the internal diameter of the fiber housing is between 4 cm and 8 cm.

63. A device according to claim 1, wherein the internal diameter of the fiber housing is around 5 cm.

64. A device according to claim 1, wherein the fibers are non-porous.

65. A device according to claim 1, wherein the fibers are solid.

66. A device according to claim 1, wherein the fibers are at least one of hollow and porous.

67. A device according to claim 66, wherein the hollow fibers are closed at fiber ends arranged in the same end of the fiber housing as an inlet to the fiber housing.

68. A device according to claim 1, wherein the fibers comprise polyester fibers or nylon fibers.

69. A device according to claim 1, wherein the fibers comprise transparent fibers.

70. A device according to claim 1, wherein the compression tool is adapted to compress the fibers at several locations along the length of the fibers.

71. A device according to claim 1, wherein the compression tool comprises one or more compressing members having at least one of non-flexible and flexible parts.

72. A device according to claim 1, wherein the fiber housing is made of a watertight material.

73. A device according to claim 1, wherein the fibers have a substantially circular cross-section with a diameter of at most 5 mm.

74. A device according to claim 1, wherein the fibers have a substantially circular cross-section with a diameter of at most 2 mm.

75. A device according to claim 1, wherein the fibers have a substantially circular cross-section with a diameter in the range of 0.001-1 mm.

76. A device according to claim 1, wherein the fibers have a substantially circular cross-section with a diameter in the range of 0.01-0.5 mm.

77. A system for filtering a fluid, comprising:
a filtering device according to claim 1,
a pump to pass a fluid to be filtered through the flow passages of the compressed fibers, and
a compression maintenance assembly to maintain the fibers in a compressed condition while passing the fluid through the flow passages.

78. A system according to claim 77, further comprising
valves to release the pressure on the outer surface of the flexible membrane thereby leaving the fibers in an uncompressed condition,
an inlet to pass at least one of a liquid and a gas through the uncompressed fibers in a direction from the inlet towards the outlet or in an opposite direction, so as to forward flush or backward flush the device.

79. A system according to claim 78, wherein the liquid to be passed through the uncompressed fibers so as to flush the fibers is unfiltered fluid.

80. A system according to claim 77, wherein the compression tool, the valves, the pump, and the inlet are computer controlled.

81. A method for filtering fluids through a device according to claim 1, the method comprising:
passing the fluid through the device;
compressing the fibers in a radial direction at a location along the flexible membrane, so as to reduce the total cross-sectional area of the fibers and thereby the cross-sectional area of the flow-passages, whereby the cross-sectional areas of the flow-passages gradually decrease towards the location; and
maintaining the pressure on the fibers while passing the fluid through the flow-passages.

82. A method according to claim 81, further comprising transmitting ultraviolet light across the fibers, so as to kill at least one of bacteria and a virus in the filtered particles.

83. A method of flushing a device according to claim 1, comprising:
releasing the pressure on the fibers; and
passing a liquid or a gas through the uncompressed fibers.

84. A method according to claim 83, wherein the liquid or gas passes the uncompressed fibers in a direction from the inlet towards the outlet or in an opposite direction, so as to forward flush or backward flush the device.

85. A method according to claim 84, wherein the liquid to be passed through the uncompressed fibers so as to flush the fibers is unfiltered fluid.

86. A device according to claim 1, wherein substantially no pressure is applied to the flexible membrane between the inlet end of the fiber housing and the location at which pressure is created.

87. A device for filtering a fluid, comprising:
a fiber housing having an inlet end with at least one inlet and an outlet end with at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid,
wherein at least part of the fiber housing is formed of a flexible membrane surrounding the fibers,
a compression tool is provided to create a pressure on an outer surface of the flexible membrane thereby compressing the fibers in a radial direction at at least one location along the length of the fibers, and
the distance from the inlet end of the fiber housing to the location of compression of the fibers is at least 25% of the total length of the fiber housing, wherein the compression tool comprises at least two blocks being positioned on opposite sides of the flexible membrane, so as to compress the fibers from two sides.

88. A device for filtering a fluid, comprising:
a fiber housing having an inlet end with at least one inlet and an outlet end with at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid,
wherein at least part of the fiber housing is formed of a flexible membrane, bounding the fibers;
a compression device is provided to create a pressure on an outer surface of the flexible membrane thereby compressing the fibers in a radial direction at at least one location along the length of the fibers, and
the distance from the inlet end of the fiber housing to the location at which pressure is created on the flexible membrane is at least 25% of the total length of the fiber housing, wherein the compression device is adapted to create the pressure on at least a part or a portion of the flexible membrane, the pressure part of portion having a dimension in the longitudinal direction of the fibers being below 0.5 times the total length of the fibers within the fiber housing, wherein the fibers have free ends at the end of the fiber housing opposite to the inlet end.

89. A device according to claim 88, wherein the fibers at the inlet end of the fiber housing are attached to an end part of the fiber housing.

90. A device according to claim 88, wherein the fibers at the inlet end of the fiber housing are glued to an end part or glued to a holding member, which holding member is arranged at the end part.

91. A device according to claim 88, wherein the compression device is adapted to vary the pressure created thereby, so as to thereby vary the total cross-section of the flow passages at the location and so as to vary the minimum size of particles being filtered trough the fibers.

92. A device according to claim 88, wherein the distance from the inlet end of the fiber housing to the location of compression of the fibers is at least 33% of the total length of the fiber housing.

93. A device according to claim 88, wherein the distance from the inlet end of the fiber housing to the location of compression of the fibers is at least 40% of the total length of the fiber housing.

94. A device according to claim 88, wherein the distance from the inlet end of the fiber housing to the location of compression of the fibers is at least 50% of the total length of the fiber housing.

95. A device according to claim 88, wherein the distance from the inlet end of the fiber housing to the location of compression of the fibers is at least 55% of the total length of the fiber housing.

96. A device according to claim 88, wherein the distance from the inlet end of the fiber housing to the location of compression of the fibers is at least 60% of the total length of the fiber housing.

97. A device according to claim 88, wherein the compression device is positioned inside the housing for compressing the fibers within inside the fiber housing.

98. A device according to claim 97, in which the compression device is a pressure chamber.

99. A device according to claim 88, wherein only part of the fiber housing in longitudinal direction of the fibers is formed of a flexible membrane, and wherein the compression device is adapted to create the pressure on substantially all of the flexible membrane part of the fiber housing.

100. A device according to claim 99, wherein the dimension of the pressure part or portion in the longitudinal direction of the fibers is below 0.5 times the total length of the fibers within the fiber housing.

101. A device according to claim 88, wherein the fiber housing has the form of a tube-like member.

102. A device according to claim 88, wherein the location at which the fibers are compressed is a predetermined location.

103. A device according to claim 88, wherein the compression device comprises hydraulics to create a pressure.

104. A device according to claim 88, wherein the fiber housing is arranged within a holding member.

105. A device according to claim 104, wherein the holding member is made of a substantially solid material.

106. A device according to claim 104, wherein the holding member is formed as a tube-like member.

107. A device according to claim 104, wherein the holding member has an inlet being sealingly connected to the inlet end of the fiber housing, and an outlet end being sealingly connected to the outlet end of the fiber housing.

108. A device according to claim 88, further comprising means for maintaining a longitudinal tension in the fibers.

109. A device according to claim 88, wherein the compression device is adapted to compress the fibers at several locations along the length of the fibers.

110. A system for filtering a fluid, comprising:
a filtering device according to claim 88,
a pump to pass a fluid to be filtered through the flow passages of the compressed fibers, and
a compression maintenance assembly to maintain the fibers in a compressed condition while passing the fluid through the flow passages.

111. A system according to claim 110, further comprising valves to release the pressure on the flexible membrane thereby leaving the fibers in an uncompressed condition,
an inlet to pass at least one of a liquid and a gas through the uncompressed fibers in a direction from the inlet towards the outlet or in an opposite direction, so as to forward flush or backward flush the device.

112. A system according to claim 110, wherein the compression device, the valves, the pump, and the inlet are computer controlled.

113. A method for filtering fluids through a device according to claim 88, the method comprising:
passing the fluid through the device;
compressing the fibers in a radial direction at a location along the flexible membrane, so as to reduce the total cross-sectional area of the fibers and thereby the cross-sectional area of the flow passages, whereby the cross sectional areas of the flow-passages gradually decrease towards the location; and
maintaining the pressure on the fibers while passing the fluid through the flow-passages.

114. A method of flushing a device according to claim 88, comprising:
releasing the pressure on the fibers; and
passing a liquid or a gas trough the uncompressed fibers.

115. A device for filtering a fluid, comprising:
a fiber housing having an inlet end with at least one inlet and an outlet end with at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid,
wherein part of the fiber housing is formed of a flexible membrane surrounding the fibers wherein the longitudinal extent of the pan of the fiber housing that is formed of a flexible membrane is less than 0.5 times the total length of the fibers within the fiber housing;
a compression tool provided to create a variably controllable pressure on an outer surface of the flexible membrane thereby compressing the fibers in a radial direction at at least one location along the length of the fibers, and
the distance from the inlet end of the fiber housing to the longitudinal position along the fiber housing at which the flexible membrane starts is at least 25% of tile total length of the fiber housing, wherein the fibers have free ends at the end of the fiber housing opposite to the inlet end.

116. A device for filtering a fluid, comprising:
a fiber housing having an inlet end with at least one inlet and an outlet end with at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid,
wherein part of the fiber housing is formed of a flexible membrane surrounding the fibers wherein the longitudinal extent of the pan of the fiber housing that is formed of a flexible membrane is less than 0.5 times the total length of the fibers within the fiber housing;
a compression device provided to create a variably controllable pressure on an outer surface of the flexible membrane thereby compressing the fibers in a radial direction at at least one location along the length of the fibers, and
the distance from the inlet end of the fiber housing to the longitudinal position along the fibre housing at which the flexible membrane starts is at least 25% of the total length of the fiber housing, wherein the fibers have free ends at the end of the fiber housing opposite to the inlet end.

117. A device far filtering a fluid, comprising:
a fiber housing having an inlet end with at least one inlet and an outlet end wit at least one outlet, the fiber housing surrounding and defining an outer bound for a plurality of fibers extending longitudinally in the fiber housing between the inlet end and the outlet end, longitudinally extending interspaces being provided between the fibers, the interspaces defining a plurality of flow passages for the fluid, wherein at least part of the fiber housing is formed of a flexible membrane surrounding the fibers, a compression tool having a surface and operable to exert an adjustable pressure on an outer surface of the flexible membrane by movement of the tool surface against the membrane surface thereby compressing the fibers in a radial direction at at least one location along the length of the fibers, and the distance from the inlet end of the fiber housing to the location at which pressure is created on the flexible membrane is at least 25% of the total length of the fiber housing.

* * * * *

UNITED STATES PATENT AND TRADEMARK OFFICE
CERTIFICATE OF CORRECTION

PATENT NO. : 7,282,155 B2  Page 1 of 1
APPLICATION NO. : 10/388165
DATED : October 16, 2007
INVENTOR(S) : Bo Boye It is certified that error appears in the above-identified patent and that said Letters Patent is hereby corrected as shown below:

On the title page item 63, please add the following information in the Related U.S. Application Data:

-- U.S. provisional application Serial No. 60/233,658, filed September 19, 2000. --

Signed and Sealed this

Tenth Day of June, 2008

JON W. DUDAS
*Director of the United States Patent and Trademark Office*